(12) United States Patent
Lee

(10) Patent No.: US 6,608,807 B1
(45) Date of Patent: Aug. 19, 2003

(54) GENERATING A MULTILEVEL CALIBRATION SEQUENCE FOR PRECOMPENSATION

(75) Inventor: David C. Lee, Zhanjiang (CN)

(73) Assignee: Calimetrics, Inc., Alameda, CA (US)

( * ) Notice: Subject to any disclaimer, the term of this patent is extended or adjusted under 35 U.S.C. 154(b) by 0 days.

(21) Appl. No.: 09/496,387

(22) Filed: Feb. 2, 2000

(51) Int. Cl.[7] .................................................. G11B 5/09
(52) U.S. Cl. .................. 369/59.26; 369/59.27
(58) Field of Search ....................... 369/59.13, 59.23, 369/59.24, 59.27, 124.04, 124.09, 59.17, 59.18, 59.26, 53.35, 53.36; 360/39; 375/253, 214, 240.23, 240.24, 241, 242, 246

(56) References Cited

U.S. PATENT DOCUMENTS

| | | | |
|---|---|---|---|
| 4,161,041 A | 7/1979 | Butler et al. ................. 365/244 |
| 4,231,113 A | 10/1980 | Blasbalg ...................... 455/29 |
| 4,965,536 A | * 10/1990 | Yoshida ....................... 375/264 |
| 5,349,611 A | * 9/1994 | Varian ......................... 375/367 |
| 5,528,607 A | * 6/1996 | Weng et al. ................. 714/775 |
| 5,642,345 A | 6/1997 | Kurebayashi et al. ....... 369/124 |
| 5,818,806 A | * 10/1998 | Wong et al. ............. 369/53.33 |
| 6,049,633 A | * 4/2000 | Cho ........................... 382/247 |

OTHER PUBLICATIONS

Fredricksen, Harold, "A Survey of Full Length Nonlinear Shift Register Cycle Algorithms", SIAM Review, vol. 24, No. 2, Apr., 1982.

Lee, Edard A. and Messerschmitt, David G., "Digital Communication", Second Edition, Kluwer Academic Publishers, 1994, pp. 591–593.

* cited by examiner

*Primary Examiner*—Thang V. Tran
(74) *Attorney, Agent, or Firm*—Van Pelt & Yi LLP

(57) ABSTRACT

A system and method are disclosed for generating a calibration sequence of multilevel symbols includes generating subsequences of digital values selected from a range of digital values using a maximal length shift register. The subsequences have a given subsequence length. The range of digital values is mapped onto a set of multilevel symbols and the multilevel symbols corresponding to the generated digital values are output to a write strategy processor.

80 Claims, 6 Drawing Sheets

GENERATING A MULTILEVEL CALIBRATION SEQUENCE FOR PRECOMPENSATION

CROSS REFERENCE TO RELATED APPLICATIONS

This application is related to U.S. patent application No. 09/253,808 entitled "Architecture for Reading a Multi-level Signal From an Optical Disc" filed Feb. 18, 1999, which is incorporated herein by reference for all purposes.

FIELD OF THE INVENTION

The present invention relates generally to data storage. More specifically, a multilevel sequence is described that is used for calibration of a system that precompensates for intersymbol interference.

BACKGROUND OF THE INVENTION

In order to increase the capacity and speed of optical data storage systems, multilevel optical recording systems have been developed. In a traditional optical recording system, reflectivity of the recording medium is modulated between two states. The density of data recorded on an optical recording medium can be increased by modulating the reflectivity of the optical recording medium among more than two states. Multilevel optical recording refers to recording multiple levels of data (i.e. more than two levels of data) at a location on an optical storage medium.

One type of optical recording medium that is particularly suitable for multilevel signal modulation is phase-change optical material. The reflectivity of a phase-change material may be controlled by using a writing laser to heat and cool the material. This process is described further in "Laser-induced crystallization phenomena in GeTe-based alloys: Characterization on nucleation and growth, (J. Appl. Phys. 78(8), Oct. 15, 1995. p.4096) by J. H. Coombs, et al. (hereinafter "Coombs") and in U.S. patent application Ser. No. 09/373,916, filed Aug. 12, 1999, entitled "High Density Data Write Strategy" which is incorporated herein by reference for all purposes. Multilevel data written on a phase-change optical disc is recovered by measuring the intensity of a beam of light reflected from the disc.

Unfortunately, at high data densities, there is a significant amount of linear and nonlinear intersymbol interference (ISI) in the reflected signal from such a disc. One technique for reducing the nonlinear ISI is to adjust the way marks are written in order to precompensate during the writing process for an expected amount of nonlinear ISI. Precompensation for ISI is described in detail in U.S. Pat. No. 5,818,806, issued Oct. 6, 1998, entitled "Method And Apparatus For Providing Equalization For The Reading Of Marks On Optical Data Storage Media". Different combinations of multilevel symbols have different amounts of linear and nonlinear ISI. The amount of ISI, especially the nonlinear ISI, is difficult to predict and may vary for different systems designed within the same manufacturing tolerances. In fact, the ISI may vary for a system as that system experiences wear.

In order to determine the appropriate amount of precompensation for a specific system at a given time, a calibration sequence can be written to and read from the recording media. By analyzing the detected output of such a calibration sequence, it is possible, when the input sequence is known, to determine an appropriate precompensation scheme that will compensate for intersymbol interference.

One such precompensation scheme is described in U.S. patent application Ser. No. 09/496,895 entitled "Write Compensation System for a Multi-Level Data Storage System" filed concurrently herewith, which is incorporated herein by reference for all purposes.

What is needed is an effective method for generating a calibration sequence containing all possible subsequences of a given length for a set of multilevel symbols. Furthermore, it would be desirable for such a calibration sequence to be pseudorandom instead of having pseudo-periodicities. Specifically, it is important that the calibration sequence not contain a high spectral content at low frequencies compared its spectral content at high frequencies. Also, it would be useful if such a system could use as little memory as possible.

SUMMARY OF THE INVENTION

Accordingly, a method is disclosed for generating a minimal length calibration sequence containing all subsequences of a given length for a set of multilevel symbols. The calibration sequence is pseudorandom, and therefore has a flat frequency spectrum. One method uses a maximal-length shift register along with some additional logic to generate the calibration sequence. In some embodiments, a sequence is modified to provide DC control while still preserving the occurrence of all combinations of subsequences. In this manner, low frequency spectral components in the sequence spectrum are suppressed. In some embodiments, a minimal length calibration sequence is converted into another sequence that is not minimal length for the purpose of suppressing low frequency spectral content. The calibration sequence can be used to determine a precompensation scheme for data written to and read from a physical medium, such as magnetic or optical data storage disks.

It should be appreciated that the present invention can be implemented in numerous ways, including as a process, an apparatus, a system, a device, a method, or a computer-readable medium that includes certain types of marks that enable reliable data storage and recovery. Several inventive embodiments of the present invention are described below.

In one embodiment, a method of generating a calibration sequence of multilevel symbols includes generating subsequences of digital values selected from a range of digital values using a maximal length shift register. The subsequences have a given subsequence length. The range of digital values is mapped onto a set of multilevel symbols and the multilevel symbols corresponding to the generated digital values are output to a write strategy processor.

In one embodiment, a calibration sequence generator includes a maximal length shift register configured to generate a calibration sequence of multilevel symbols by generating subsequences of digital values selected from a range of digital values. The subsequences have a given subsequence length. A symbol generator is configured to map the range of digital values onto a set of multilevel symbols and to output the multilevel symbols corresponding to the generated digital values to a write strategy processor.

In one embodiment, a computer program product for generating a calibration sequence of multilevel symbols is embodied in a computer readable medium and includes computer instructions for generating subsequences of digital values selected from a range of digital values using a maximal length shift register. The subsequences have a given subsequence length. Interactions are also included for mapping the range of digital values onto a set of multilevel symbols; and outputting the multilevel symbols corresponding to the generated digital values to a write strategy processor.

In one embodiment, a method of generating a calibration sequence of multilevel symbols includes generating subsequences of digital values selected from a range of digital values. The subsequences have a given subsequence length. The range of digital values is mapped onto a set of multilevel symbols and the multilevel symbols corresponding to the generated digital values are output to a write strategy processor.

In one embodiment, a calibration sequence generator is configured to generate a calibration sequence of multilevel symbols by generating subsequences of digital values selected from a range of digital values. The subsequences have a given subsequence length. A symbol generator is configured to map the range of digital values onto a set of multilevel symbols and to output the multilevel symbols corresponding to the generated digital values to a write strategy processor.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

In one embodiment, a calibration sequence containing all subsequences of a given length for a set of multilevel symbols is generated. The multilevel symbols are derived by mapping a set of bits onto a symbol set. For example, all combinations of 8 multilevel symbols for subsequences that are 5 symbols long could be written to the medium, with each symbol being specified by a set of 3 bits. One method for generating a calibration sequence of minimal length that contains all subsequences of a certain length is to use the deBruijn algorithm. The resulting sequences are called deBruijn sequences. Unfortunately, deBruijn sequences may be complex to generate and may require extensive memory. deBruijn sequences also have pseudo-periodicities, resulting in very strong spectral components at low frequencies. Such low frequency components in a read signal are undesirable because they tend to interfere with proper tracking of the optical read head. As described below, the low frequency components are reduced in some embodiments by dividing the sequence into blocks and reordering the blocks.

Figure 1:
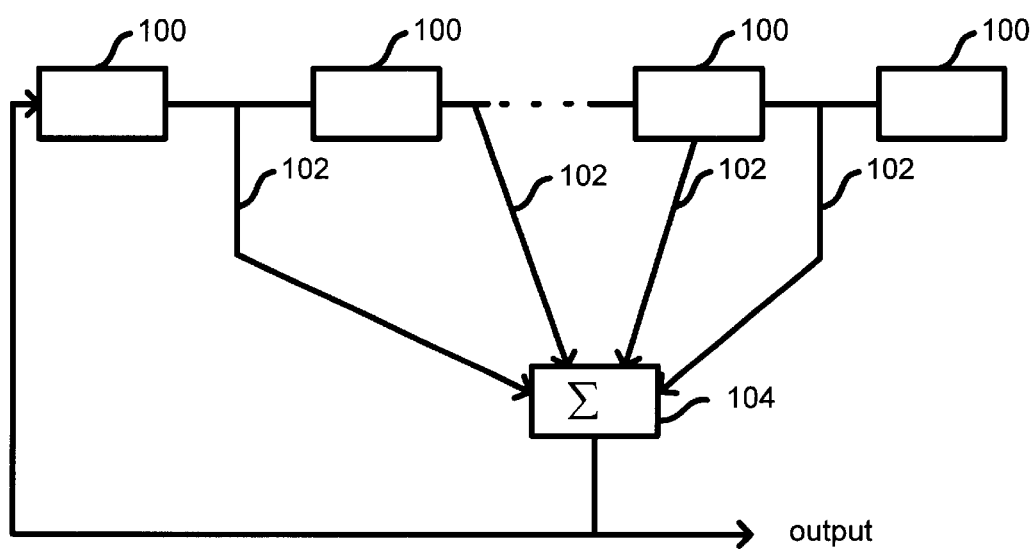
FIG. 1 is a block diagram illustrating a calibration sequence generator that uses a MLSR to generate a calibration sequence.

A more preferable method of generating a minimal-length calibration sequence that contains all combinations of subsequences of a given length for a set of multilevel symbols uses a maximal-length shift register (MLSR). FIG. 1 is a block diagram illustrating a calibration sequence generator that uses a MLSR to generate such a calibration sequence. Bit delay elements 100 store the current state of the shift register. Connections 102 between the delay elements and a summer 104 control the output of the shift register. The output of the shift register is fed back into the input of the first delay element one clock cycle after the output is generated. Because there are a finite number of states in the shift register, after a number of bit shifts, the shift register eventually returns to its starting state. The output sequence of bits, therefore, eventually repeats and is periodic. If there are L bit delay elements in the shift register, then there are $2^L$ possible states. The largest period possible, or the maximum length, is $2^L-1$. (If the shift register is in state zero, then it will always remain in state zero.) For a given L, only certain connections will result in such a maximal-length shift register. Such connections, and MLSR's in general are described in detail in *Digital Communications*, Lee, Edward A. and Messerschmitt, David G., Second Edition, Kluwer Academic Publishers, 1994, which is herein incorporated by reference for all purposes. The MLSR is preferred over the deBruijn sequence generator because the MLSR uses less memory and is less complex in most implementations.

Figure 2:
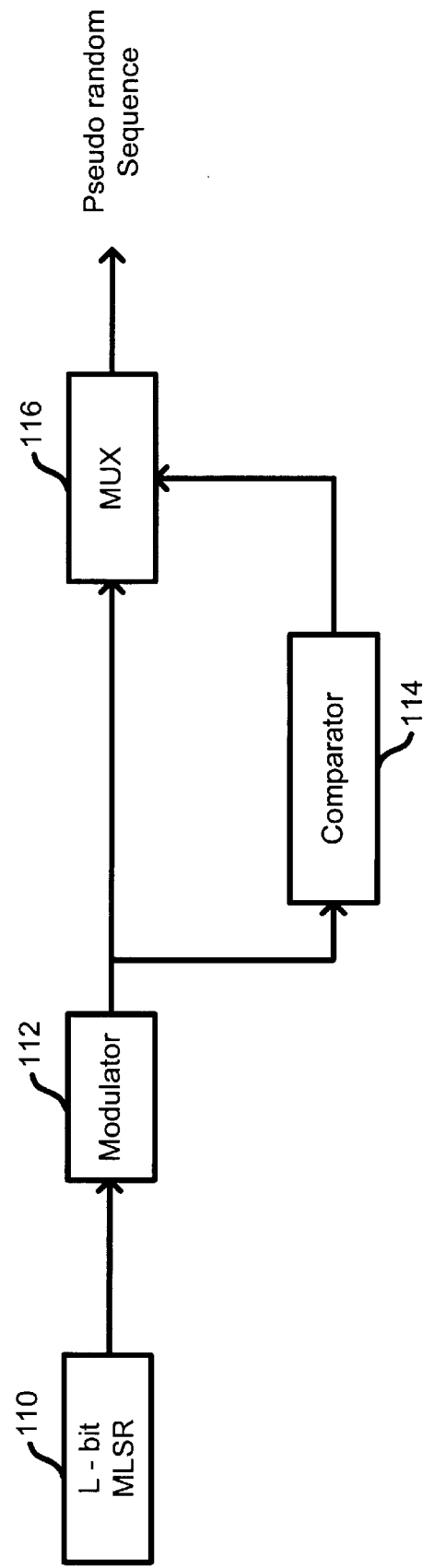
FIG. 2 is a block diagram illustrating a system for generating a minimal-length calibration sequence containing all subsequences of a given length for a set of multilevel symbols from a MLSR bit sequence.

FIG. 2 is a block diagram illustrating a system for generating a minimal-length calibration sequence containing all subsequences of a given length for a set of multilevel symbols from a MLSR bit sequence. For the purpose of this example, M is the number of levels and K is the number of symbols in the subsequence. For the purpose of simplifying the example, M is a power of 2. It can be shown that there are $M^K$ possible subsequences of K symbols with M levels. The shortest possible sequence that contains all $M^K$ possible subsequences must have length $M^K$, assuming that the sequence is cyclically repeated.

An L-bit MLSR 110 generates an output bit sequence. The output bit sequence contains every subsequence of L bits, except the all-zeros bit subsequence. L is chosen such that:

$$L = K \log_2 M.$$

Thus, all subsequences of K symbols can be generated where each symbol comprises $\log_2 M$ bits. Each group of $\log_2 M$ bits is converted into an M-level symbol using a modulator 112. After $\log_2 M$ periods, an M-ary symbol sequence of length $M^K - 1$ is obtained. Assuming that $M^K - 1$ does not divide $\log_2 M$, then the symbol sequence contains every subsequence of K symbols except the all-zeros symbol subsequence. The all-zeros symbol subsequence can be added by finding a subsequence of K−1 zeros within the symbol sequence using a logic comparator 114, and then inserting another symbol zero after the subsequence of K−1 zeros using a multiplexer 116. Altogether there are M such subsequences of K−1 zeros, and it is generally simplest to find and use the first one. The final symbol sequence is of length $M^K$ and contains all subsequences of M-ary symbols of length K.

It should be noted that in some embodiments, the output of the MLSR is stored in a RAM and then output to the modulator. In other embodiments, other methods of generating the sequence can be used. For example, a storage device may store all the symbols and send the symbols to the RAM when they are needed.

Figure 3A:
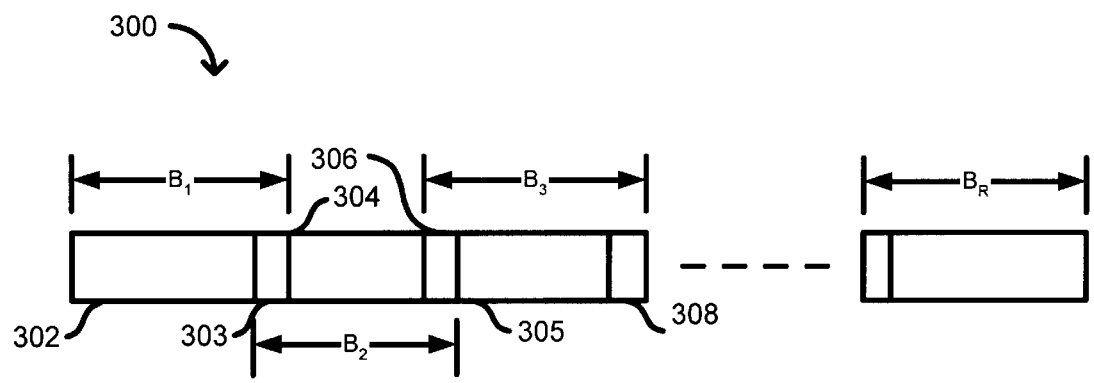
FIG. 3A is a diagram illustrating how an input sequence may be divided into overlapping blocks B1, B2, ..., BR.

The DC and low frequency content of the read signal generated when the symbol sequence is read can be controlled by modifying the pseudo-random sequence described above. The DC control method described below is also applied to a deBruijn sequence in some embodiments. FIG. 3A is a diagram illustrating how an input sequence may be divided into overlapping blocks B1, B2, . . . , BR. Each block B includes N symbols, and R is the number of blocks. The overlap length between adjacent blocks is K−1 symbols.

The beginning of input data sequence 300 is divided into overlapping blocks B1, B2, and B3. Block B1 begins at a point 302 at the beginning of data sequence 300 and ends at a point 304. Block B2 overlaps block B1 and begins at a point 303 that occurs K−1 symbols before point 304. Block B2 ends at a point 305. Block B3 begins at a point 306 that occurs K−1 symbols before point 305. Block B3 ends at a point 308. These overlapping blocks continue until a final overlapping block BR occurs.

Figure 3B:
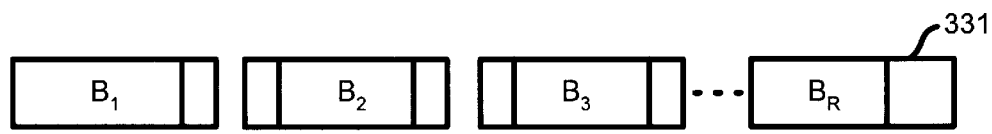
FIG. 3B is a diagram illustrating blocks B1, B2, B3 ... BR arranged sequentially with the overlapping portion of B1 at the end of block B1 being repeated at the beginning of block B2.

FIG. 3B is a diagram illustrating blocks B1, B2, B3 . . . BR arranged sequentially with the overlapping portion of B1 at the end of block B1 being repeated at the beginning of block B2. Likewise, the overlap at the end of block B2 is repeated at the beginning of block B3. At the end of the sequence, the input data may run out in the middle of the final block BR. Filler data 331 is inserted at the end of block BR to complete the block.

Figure 3C:
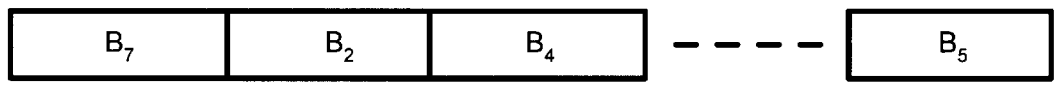
FIG. 3C is a diagram illustrating reordered blocks.

FIG. 3C is a diagram illustrating reordered blocks. The sequence of blocks now ends with block B5. The blocks are reordered for the purpose of preventing significant DC or low frequency spectral components from occurring in the read signal when the blocks are read. This aspect of the invention is referred to as DC control of the calibration sequence.

The overlap is overhead that is introduced for the purpose of rearranging the blocks to implement DC control. The overlap enables the blocks to be rearranged without losing the sequences that occur across the borders of two blocks (i.e., sequences that include symbols from the end of one block and symbols from the beginning of the next block). The K−1 overlap causes each block to carry with it enough symbols to complete all the required sequences. The larger N is for a given amount of overlap, the less overhead there will be. However, as N increases, control over the DC and low-frequency content of the final sequence is decreased.

Control over the DC and low-frequency content of the final sequence is effected by rearranging block to limit the running digital sum (RDS) of the sequence. The digital value (DV) of an M-ary symbol $x = 0_i - M - 1$ is given by:

$$DV(x) = 2*x - (M-1).$$

The digital sum value (DSV) of a block B of M-ary symbols is given by:

$$DSV(B) = \Sigma DV(bi),$$

where i=1 to N and where bi is a symbol in block B.

The RDS of a sequence at time k is the DSV from the first symbol of the sequence up to the kth symbol. In general, if the absolute value of the RDS grows large, then the sequence will have significant DC and low-frequency content. The maximum absolute RDS of a deBruijn sequence is quite large, the and maximum absolute RDS of a pseudo-random sequence, though generally lower, may still be unacceptably large.

In general, the input sequence length does not divide N−K+1, so the final block contains the end of the input sequence, the first K−1 symbols at the start, and some extra symbols to fill out the block. The extra symbols filling the last block can be chosen so that the total sum of the DSV's of all the blocks is zero.

Figure 4:
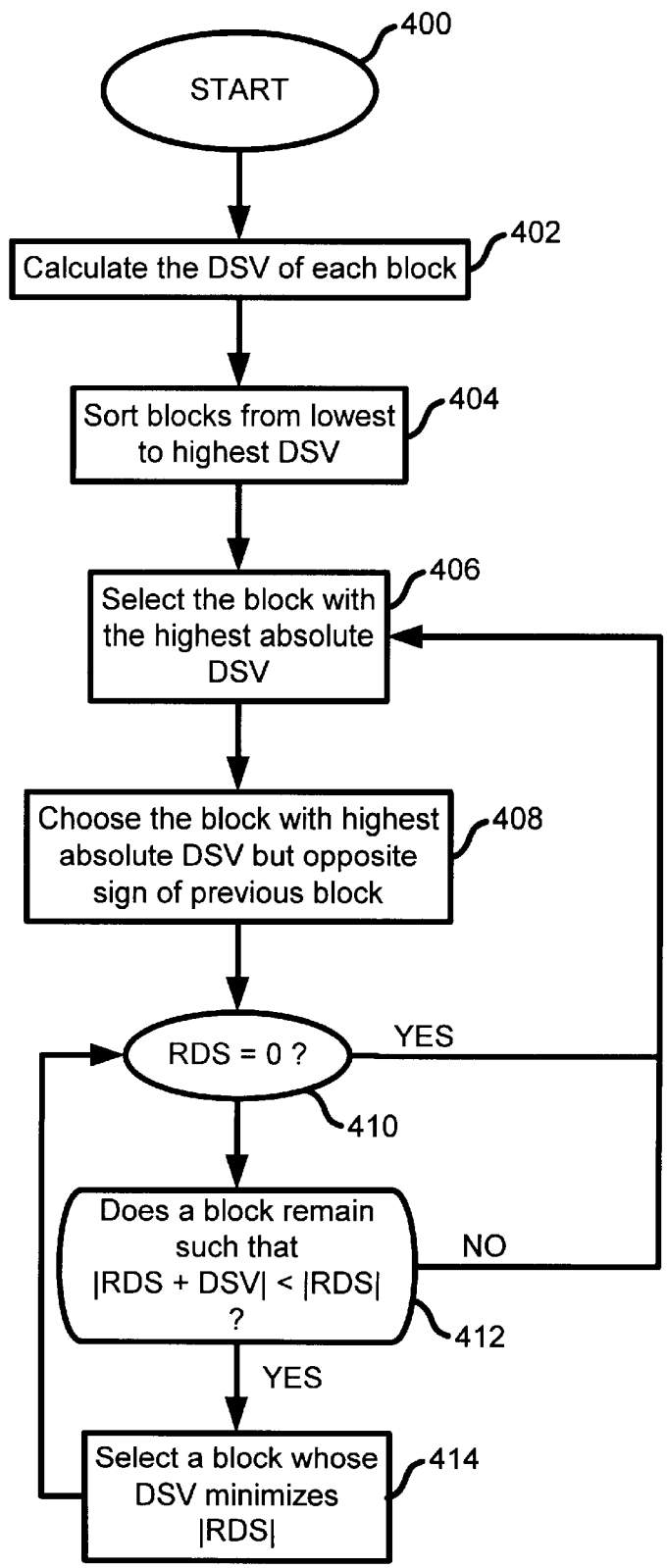
FIG. 4 is a flow chart illustrating a method for rearranging blocks.

The maximum absolute RDS is lowered by rearranging the blocks shown in FIG. 3C. The blocks are rearranged so that blocks with DSV values that cancel each other out are grouped together. In this manner, low frequency and DC components are canceled. Any appropriate method may be used to search for sets of canceling blocks to be grouped together when the blocks are reordered. FIG. 4 is a flow chart illustrating a method for rearranging blocks that is used in one embodiment. Canceling blocks are first found for the blocks with the largest DSV. The block with the largest DSV is selected and the block with the next largest DSV of opposite sign is used to partially cancel the first block. If possible, blocks with smaller DSV's are chosen to make up the difference between the first two blocks and then the next largest block is selected.

The process starts at 400. In a step 402, the DSV of each block is calculated. Next, in a step 404, the blocks are sorted and arranged from the lowest to the highest DSV. In a step 406, the block is chosen that has the highest absolute value DSV is selected. Then, in a step 408, the block is chosen that has the next highest absolute value DSV and that has a DSV with a sign that is the opposite of the sign of the DXV of the previously selected block. Those two blocks are grouped together and, in a step 410, it is determined whether the RDS of the two blocks is equal to 0. If the RDS is zero, then control is transferred back to step 406 and the next remaining block with the highest absolute value of DSV is selected. If the RDS is not equal to 0, then control is transferred to a step 412 and it is determined whether a block remains that can be combined with the already combined blocks in a manner such that the RDS is decreased. That is, it is determined whether:

$$|RDS+DSV| < |RDS|.$$

If such a block has not yet been included in the sequence, then control is transferred to a step 414 where the block is selected that brings the absolute value of the RDS closest to zero. Control is then transferred back to step 410. If, in step 412, no block exists that can be inserted in the output sequence to decrease the RDS, then control is transferred back to step 406 and the next remaining block with the highest absolute DSV is selected. The process illustrated in FIG. 4 continues until there are no remaining modified input blocks.

It should be noted that in other embodiments, other suitable computer search techniques may be used to determine an appropriate reordering of blocks to limit the RDS. In general, the particular search method used is not significant so long as an appropriate reordering is determined in a reasonably efficient manner.

Figure 5:
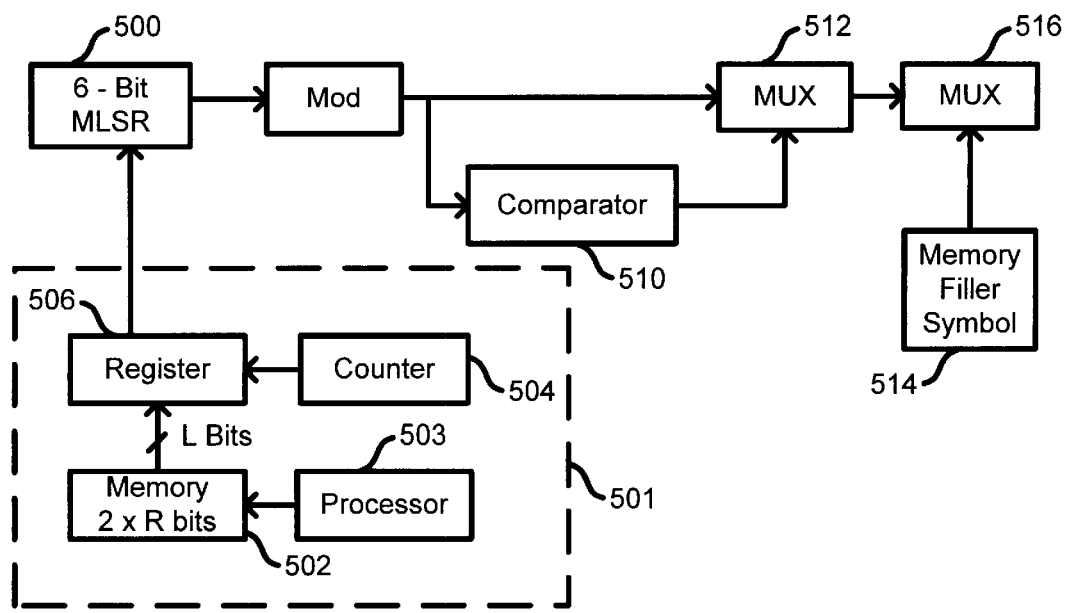
FIG. 5 is a block diagram illustrating a system for reordering the blocks to produce the appropriate output sequence.

FIG. 5 is a block diagram illustrating a system for reordering the blocks to produce the appropriate output sequence. For each block, there is a corresponding L-bit starting state of an MLSR 500. A block sorter 501 initializes the state of the MLSR to cause the MLSR to sequentially output the sorted blocks. Block sorter 501 includes a memory 502, a counter 504, and a register 506. Each L-bit starting state is stored in memory 502 in the desired block order. Thus, memory 502 requires at least L*R memory bits. A processor 503 is used to implement a process for determining the desired block order as described above. A counter 504 determines when MLSR 500 reaches the end of a block and triggers a register 506 to load the next L-bit state from memory 502. The output of MLSR 500 is input to a modulator 508 that converts the output to a multilevel signal. The output of modulator 508 is input to a comparator 510 and a MUX 512 used to add the all zero subsequence in a manner similar to that described in connection with FIG. 2. For the last block, another memory 514 stores the filler symbols. A multiplexer 516 loads the filler symbols into the last block to complete the sequence and return the RDS to zero. In one embodiment, a counter is used to determine when the last block occurs for the purpose of directing multiplexer 516 to add filler symbols. It should be noted that in some embodiments, memory 514 is combined with memory 502 and that multiplexer 516 may also be combined with multiplexer 512.

Figure 6A:
FIG. 6A is a diagram illustrating the resulting block format.
Figure 6B:
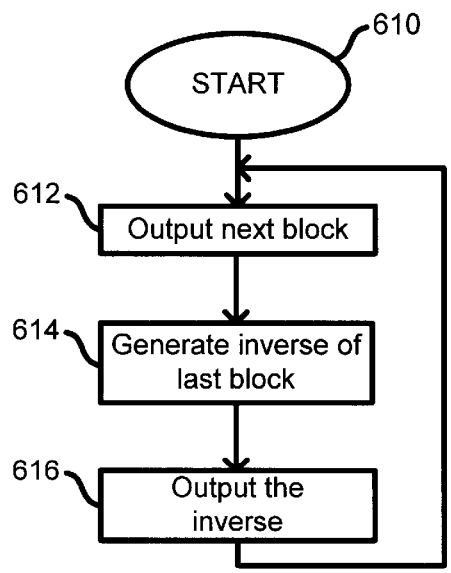
FIG. 6B is a flow chart illustrating a process for inserting the inverse blocks to control the RDS.

Another method of lowering the maximum absolute RDS is to insert after each block the inverse of that block, so that the RDS at the end of each block-inverse block pair is zero. This results in every subsequence of K symbols being repeated twice instead of once. Also, as described above, the blocks include overlapping portions of length K−1, as described above. FIG. 6A is a diagram illustrating the resulting block format. Each block is followed by its own inverse, which cancels its DSV exactly. FIG. 6B is a flow chart illustrating a process for inserting the inverse blocks to control the RDS.

The process starts at 610. In a step 612, the next block is output. Next, in a step 614, the inverse of the last block output is generated. The inverse is output in step 616 and control is transferred back to step 612. The process repeats until the last block is output at which point the process ends.

Figure 7:
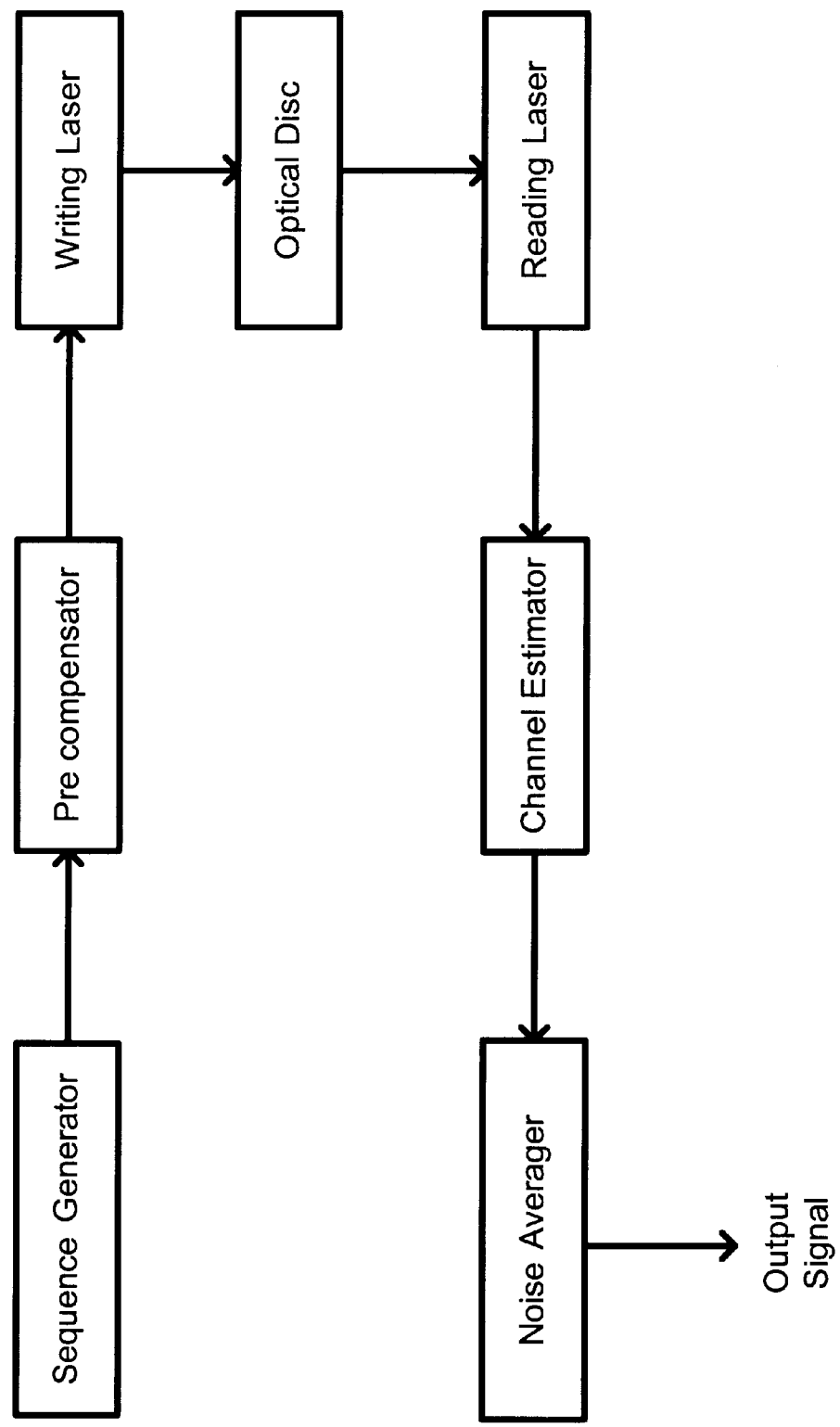
FIG. 7 is a block diagram illustrating an optical data storage system.

FIG. 7 is a block diagram illustrating an optical data storage system that uses the sequences generated in the manner described above to calibrate a precompensation matrix for the purpose of adjusting for nonlinear intersymbol interference. A sequence generator 700 generates the multilevel calibration sequence. The calibration sequence is input to a precompensator 702 that precompensates the signal to compensate for ISI. A write laser 704 writes this signal to the disc 706 and a read laser 708 reads it the signal. The write and read lasers are, in some embodiments, the same laser operating at different power levels. A channel estimator 710 may be included to remove some of the ISI that may be characterized by a channel model. In one embodiment, the channel estimator uses a linear model of the channel to remove linear ISI.

The output of the channel estimator may be input to a noise averager 712. In one embodiment, several periods of the calibration sequence are written so that noise averager 712 can calculate the average signal over several repetitions of the calibration sequence and thus remove the noise. In another embodiment, instead of writing multiple periods of the calibration sequence, a calibration sequence is used that includes all subsequences of a greater length than the subsequences used for precompensation.

The signal output from noise averager is compared to an expected or desired output signal for the known input calibration sequence. The difference between the two signals is used to derive an amount of precompensation that compensates for intersymbol interference that is not canceled by channel estimator 710. The precompensation may be implemented using a precompensation matrix as is described in "Write Compensation for a Multilevel Data Storage System," which was previously incorporated by reference, and which also describes a method for deriving the precompensation. In one embodiment, the precompensation matrix includes modified write signal control parameters for all possible subsequences of three input symbols.

The calibration process may require that multiple periods of the calibration sequence be written to the disc. In one embodiment, the calibration sequence derived above is repeated. In another embodiment, instead of writing multiple periods of the calibration sequence, a calibration sequence is used that includes all subsequences of a greater length than the subsequences used for precompensation.

A system and method for generating a calibration sequence used to determine an appropriate amount of precompensation for an optical data storage system has been disclosed. Like a deBruijn sequence, the precompensation sequence includes all possible combinations of symbols for subsequences of a given length. The disclosed calibration sequence, however, is generated using a maximal length shift register that requires less memory than the generation of a deBruijn sequence. In addition, the calibration sequence may be divided into overlapping blocks that are rearranged for the purpose of limiting DC and low frequency components in the read signal.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of generating a calibration sequence of multilevel symbols comprising
  generating subsequences of digital values selected from a range of digital values using a maximal length shift register, the subsequences having a given subsequence length;
  mapping the range of digital values onto a set of multilevel symbols; and
  outputting the multilevel symbols corresponding to the generated digital values to a write strategy processor.

2. A method of generating a calibration sequence of multilevel symbols as recited in claim 1 wherein generating subsequences of digital values selected from a range of digital values using a maximal length shift register includes:

generating a pseudo-random sequence that includes all possible subsequences for the given subsequence length except for an all zero subsequence; and inserting an additional zero in the pseudo-random sequence to provide an occurrence of the all zero subsequence.

3. A method of generating a calibration sequence of multilevel symbols as recited in claim 2 wherein a multiplexer is used to insert an additional zero in the pseudo-random sequence to provide an occurrence of the all zero subsequence.

4. A method of generating a calibration sequence of multilevel symbols as recited in claim 1 wherein the write strategy processor includes precompensation.

5. A method of generating a calibration sequence of multilevel symbols as recited in claim 4 wherein the precompensation is determined by a calibration process using the calibration sequence.

6. A method of generating a calibration sequence of multilevel symbols as recited in claim 1 further including writing the multilevel symbols to an optical disc.

7. A method of generating a calibration sequence of multilevel symbols as recited in claim 1 wherein the calibration sequence is a minimal length calibration sequence.

8. A method of generating a calibration sequence of multilevel symbols as recited in claim 1 wherein a multiplexer is used to convert the digital values to multilevel symbols.

9. A method of generating a calibration sequence of multilevel symbols as recited in claim 1 further including rearranging the calibration sequence of multilevel symbols to reduce the low frequency content of a write signal derived from the calibration sequence.

10. A method of generating a calibration sequence of multilevel symbols as recited in claim 1 further including dividing the calibration sequence into overlapping blocks and adding filler data to the last block.

11. A method of generating a calibration sequence of multilevel symbols as recited in claim 10 wherein the filler data brings the running digital sum of the entire sequence to approximately zero.

12. A method of generating a calibration sequence of multilevel symbols as recited in claim 1 further including:

dividing the calibration sequence into overlapping blocks; and rearranging the blocks.

13. A method of generating a calibration sequence of multilevel symbols as recited in claim 12 wherein the blocks are rearranged in a manner that reduces the DC content of a write signal derived from the calibration sequence.

14. A method of generating a calibration sequence of multilevel symbols as recited in claim 12 wherein the blocks are rearranged in a manner that reduces the low frequency content of a write signal derived from the calibration sequence.

15. A method of generating a calibration sequence of multilevel symbols as recited in claim 14 wherein the overlapping blocks include an overlap of one symbol less than the given subsequence length at the beginning of each overlapping block after a first overlapping block and an overlap of one symbol less than the given subsequence length at the end of each overlapping block until a last overlapping block.

16. A method of generating a calibration sequence of multilevel symbols as recited in claim 14 wherein the low frequency content of the write signal derived from the calibration sequence is reduced by reducing the running digital sum of the blocks.

17. A method of generating a calibration sequence of multilevel symbols as recited in claim 14 wherein the low frequency content of the write signal derived from the calibration sequence is reduced by grouping together blocks having canceling digital sum values.

18. A method of generating a calibration sequence of multilevel symbols as recited in claim 1 further including:

dividing the calibration sequence into blocks;

calculating inverse blocks for the blocks; and inserting the inverse blocks into the calibration sequence.

19. A method of generating a calibration sequence of multilevel symbols as recited in claim 18 wherein each inverse block is inserted immediately after an individual block that is the inverse of the inverse block.

20. A calibration sequence generator including:

a maximal length shift register configured to generate a calibration sequence of multilevel symbols by generating subsequences of digital values selected from a range of digital values, the subsequences having a given subsequence length; and a symbol generator configured to map the range of digital values onto a set of multilevel symbols and to output the multilevel symbols corresponding to the generated digital values to a write strategy processor.

21. A calibration sequence generator as recited in claim 20 wherein the maximal length shift register is configured to generate a pseudo-random sequence that includes all possible subsequences for the given subsequence length except for an all zero subsequence and further including a sequence modifier configured to insert an additional zero in the pseudo-random sequence to provide an occurrence of the all zero subsequence.

22. A calibration sequence generator as recited in claim 21 wherein the sequence modifier includes a multiplexer configured to insert an additional zero in the pseudorandom sequence to provide an occurrence of the all zero subsequence.

23. A calibration sequence generator as recited in claim 20 wherein the write strategy processor includes precompensation.

24. A calibration sequence generator as recited in claim 23 wherein the precompensation is determined by a calibration process using the calibration sequence.

25. A calibration sequence generator as recited in claim 20 wherein the multilevel symbols are written to an optical disc.

26. A calibration sequence generator as recited in claim 20 wherein the calibration sequence is a minimal length calibration sequence.

27. A calibration sequence generator as recited in claim 20 wherein the symbol generator includes a multiplexer configured to convert the digital values to multilevel symbols.

28. A calibration sequence generator as recited in claim 20 further including a sorter configured to rearrange the calibration sequence of multilevel symbols to reduce the low frequency content of a write signal derived from the calibration sequence.

29. A calibration sequence generator as recited in claim 28 wherein the sorter includes a memory, a counter and a register configured to sequentially initialize the maximal length shift register to output the rearranged calibration sequence.

30. A calibration sequence generator as recited in claim 28 wherein the sorter is configured to divide the calibration sequence into overlapping blocks and add filler data to the last block.

31. A calibration sequence generator as recited in claim 30 wherein the filler data brings the running digital sum of the entire sequence to approximately zero.

32. A calibration sequence generator as recited in claim 20 further including a sorter configured to divide the calibration sequence into overlapping blocks and rearrange the overlapping blocks.

33. A calibration sequence generator as recited in claim 32 wherein the overlapping blocks are rearranged in a manner that reduces the DC content of a write signal derived from the calibration sequence.

34. A calibration sequence generator as recited in claim 32 wherein the overlapping blocks are rearranged in a manner that reduces the low frequency content of a write signal derived from the calibration sequence.

35. A calibration sequence generator as recited in claim 34 wherein the overlapping blocks include an overlap of one symbol less than the given subsequence length at the beginning of each overlapping block after a first overlapping block and an overlap of one symbol less than the given subsequence length at the end of each overlapping block until a last overlapping block.

36. A calibration sequence generator as recited in claim 34 wherein the low frequency content of the write signal derived from the calibration sequence is reduced by reducing the running digital sum of the blocks.

37. A calibration sequence generator as recited in claim 34 wherein the low frequency content of the write signal derived from the calibration sequence is reduced by grouping together blocks having canceling digital sum values.

38. A calibration sequence generator as recited in claim 20 further including a low frequency canceler configured to divide the calibration sequence into blocks; calculate inverse blocks for the blocks; and insert the inverse blocks into the calibration sequence.

39. A calibration sequence generator as recited in claim 38 wherein each inverse block is inserted immediately after an individual block that is the inverse of the inverse block.

40. A computer program product for generating a calibration sequence of multilevel symbols, the computer program product being embodied in a computer readable medium and comprising computer instructions for:
generating subsequences of digital values selected from a range of digital values using a maximal length shift register, the subsequences having a given subsequence length;
mapping the range of digital values onto a set of multilevel symbols; and
outputting the multilevel symbols corresponding to the generated digital values to a write strategy processor.

41. A method of generating a calibration sequence of multilevel symbols comprising:
generating subsequences of digital values selected from a range of digital values, the subsequences having a given subsequence length;
mapping the range of digital values onto a set of multilevel symbols; and
outputting the multilevel symbols corresponding to the generated digital values to a write strategy processor.

42. A method of generating a calibration sequence of multilevel symbols as recited in claim 41 wherein generating subsequences of digital values selected from a range of digital values includes:
generating a pseudo-random sequence that includes all possible subsequences for the given subsequence length except for an all zero subsequence; and
inserting an additional zero in the pseudo-random sequence to provide an occurrence of the all zero subsequence.

43. A method of generating a calibration sequence of multilevel symbols as recited in claim 42 wherein a multiplexer is used to insert an additional zero in the pseudo-random sequence to provide an occurrence of the all zero subsequence.

44. A method of generating a calibration sequence of multilevel symbols as recited in claim 41 wherein the write strategy processor includes precompensation.

45. A method of generating a calibration sequence of multilevel symbols as recited in claim 44 wherein the precompensation is determined by a calibration process using the calibration sequence.

46. A method of generating a calibration sequence of multilevel symbols as recited in claim 41 further including writing the multilevel symbols to an optical disc.

47. A method of generating a calibration sequence of multilevel symbols as recited in claim 41 wherein the calibration sequence is a minimal length calibration sequence.

48. A method of generating a calibration sequence of multilevel symbols as recited in claim 41 wherein a multiplexer is used to convert the digital values to multilevel symbols.

49. A method of generating a calibration sequence of multilevel symbols as recited in claim 41 further including rearranging the calibration sequence of multilevel symbols to reduce the low frequency content of a write signal derived from the calibration sequence.

50. A method of generating a calibration sequence of multilevel symbols as recited in claim 41 further including dividing the calibration sequence into overlapping blocks and adding filler data to the last block.

51. A method of generating a calibration sequence of multilevel symbols as recited in claim 50 wherein the filler data brings the running digital sum of the entire sequence to approximately zero.

52. A method of generating a calibration sequence of multilevel symbols as recited in claim 41 further including:
dividing the calibration sequence into overlapping blocks; and
rearranging the blocks.

53. A method of generating a calibration sequence of multilevel symbols as recited in claim 52 wherein the blocks are rearranged in a manner that reduces the DC content of a write signal derived from the calibration sequence.

54. A method of generating a calibration sequence of multilevel symbols as recited in claim 52 wherein the blocks are rearranged in a manner that reduces the low frequency content of a write signal derived from the calibration sequence.

55. A method of generating a calibration sequence of multilevel symbols as recited in claim 54 wherein the overlapping blocks include an overlap of one symbol less than the given subsequence length at the beginning of each overlapping block after a first overlapping block and an overlap of one symbol less than the given subsequence length at the end of each overlapping block until a last overlapping block.

56. A method of generating a calibration sequence of multilevel symbols as recited in claim 54 wherein the low frequency content of the write signal derived from the calibration sequence is reduced by reducing the running digital sum of the blocks.

57. A method of generating a calibration sequence of multilevel symbols as recited in claim 54 wherein the low frequency content of the write signal derived from the calibration sequence is reduced by grouping together blocks having canceling digital sum values.

58. A method of generating a calibration sequence of multilevel symbols as recited in claim 41 further including:
dividing the calibration sequence into blocks;
calculating inverse blocks for the blocks; and
inserting the inverse blocks into the calibration sequence.

59. A method of generating a calibration sequence of multilevel symbols as recited in claim 41 wherein the subsequences of digital values are derived from a debruijn sequence.

60. A method of generating a calibration sequence of multilevel symbols as recited in claim 58 wherein each inverse block is inserted immediately after an individual block that is the inverse of the inverse block.

61. A calibration sequence generator including:
sequence generator configured to generate a calibration sequence of multilevel symbols by generating subsequences of digital values selected from a range of digital values, the subsequences having a given subsequence length; and
a symbol generator configured to map the range of digital values onto a set of multilevel symbols and to output the multilevel symbols corresponding to the generated digital values to a write strategy processor.

62. A calibration sequence generator as recited in claim 61 wherein the sequence generator is configured to generate a pseudo-random sequence that includes all possible subsequences for the given subsequence length except for an all zero subsequence and further including a sequence modifier configured to insert an additional zero in the pseudo-random sequence to provide an occurrence of the all zero subsequence.

63. A calibration sequence generator as recited in claim 62 wherein the sequence modifier includes a multiplexer configured to insert an additional zero in the pseudorandom sequence to provide an occurrence of the all zero subsequence.

64. A calibration sequence generator as recited in claim 61 wherein the write strategy processor includes precompensation.

65. A calibration sequence generator as recited in claim 64 wherein the precompensation is determined by a calibration process using the calibration sequence.

66. A calibration sequence generator as recited in claim 61 wherein the multilevel symbols are written to an optical disc.

67. A calibration sequence generator as recited in claim 61 wherein the calibration sequence is a minimal length calibration sequence.

68. A calibration sequence generator as recited in claim 61 wherein the symbol generator includes a multiplexer configured to convert the digital values to multilevel symbols.

69. A calibration sequence generator as recited in claim 61 further including a sorter configured to rearrange the calibration sequence of multilevel symbols to reduce the low frequency content of a write signal derived from the calibration sequence.

70. A calibration sequence generator as recited in claim 69 wherein the sorter includes a memory, a counter and a register configured to sequentially initialize the maximal length shift register to output the rearranged calibration sequence.

71. A calibration sequence generator as recited in claim 69 wherein the sorter is configured to divide the calibration sequence into overlapping blocks and add filler data to the last block.

72. A calibration sequence generator as recited in claim 71 wherein the filler data brings the running digital sum of the entire sequence to approximately zero.

73. A calibration sequence generator as recited in claim 61 further including a sorter configured to divide the calibration sequence into overlapping blocks and rearrange the overlapping blocks.

74. A calibration sequence generator as recited in claim 73 wherein the overlapping blocks are rearranged in a manner that reduces the DC content of a write signal derived from the calibration sequence.

75. A calibration sequence generator as recited in claim 73 wherein the overlapping blocks are rearranged in a manner that reduces the low frequency content of a write signal derived from the calibration sequence.

76. A calibration sequence generator as recited in claim 75 wherein the overlapping blocks include an overlap of one symbol less than the given subsequence length at the beginning of each overlapping block after a first overlapping block and an overlap of one symbol less than the given subsequence length at the end of each overlapping block until a last overlapping block.

77. A calibration sequence generator as recited in claim 75 wherein the low frequency content of the write signal derived from the calibration sequence is reduced by reducing the running digital sum of the blocks.

78. A calibration sequence generator as recited in claim 75 wherein the low frequency content of the write signal derived from the calibration sequence is reduced by grouping together blocks having canceling digital sum values.

79. A calibration sequence generator as recited in claim 61 further including a low frequency canceler configured to divide the calibration sequence into blocks; calculate inverse blocks for the blocks; and insert the inverse blocks into the calibration sequence.

80. A calibration sequence generator as recited in claim 79 wherein each inverse block is inserted immediately after an individual block that is the inverse of the inverse block.

* * * * *